Oct. 17, 1933.  W. L. WRIGHT  1,930,498
OPTICAL SYSTEM FOR MOTION PICTURE PHOTOGRAPHY
Filed Sept. 19, 1930   2 Sheets-Sheet 2
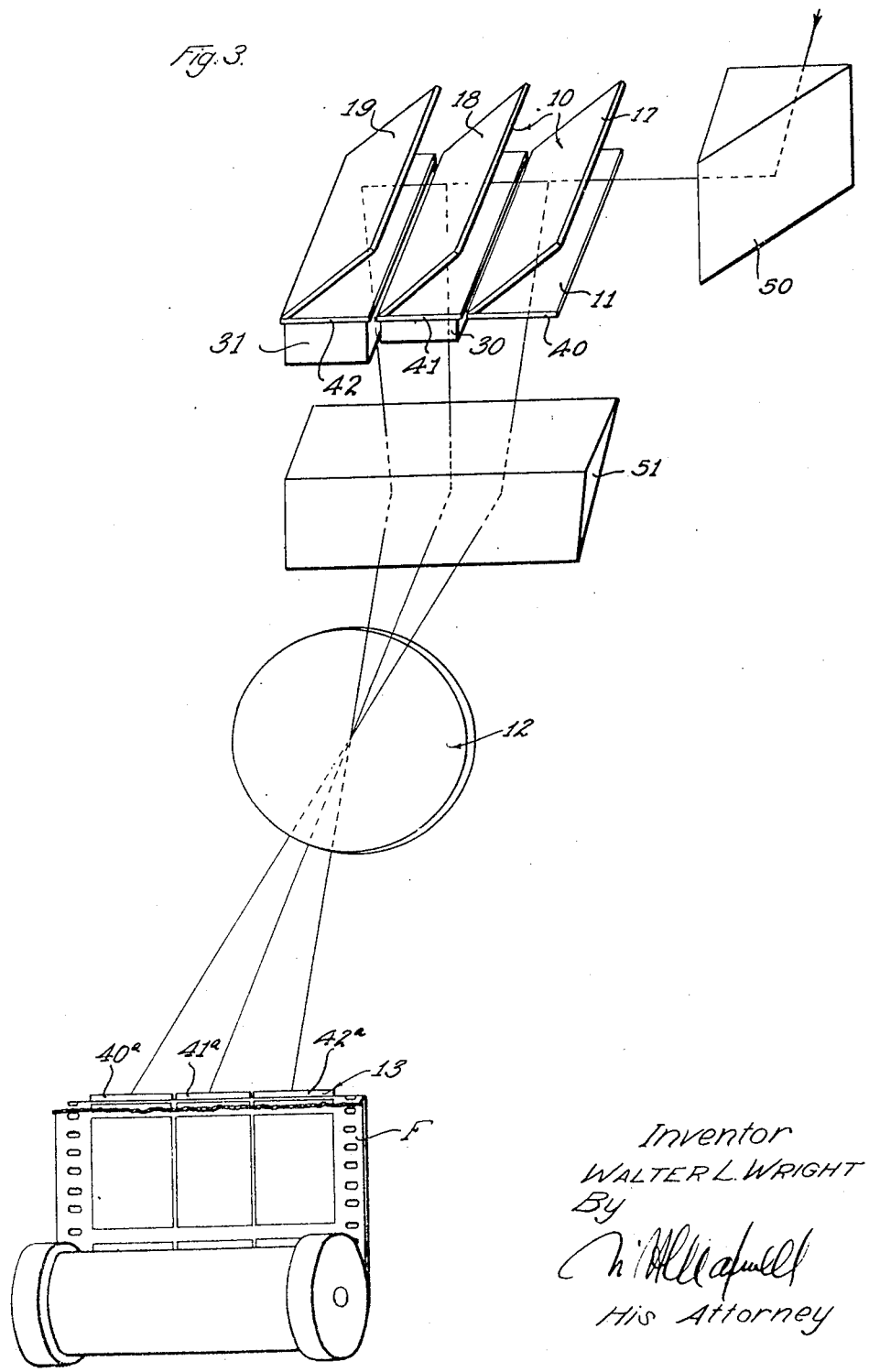

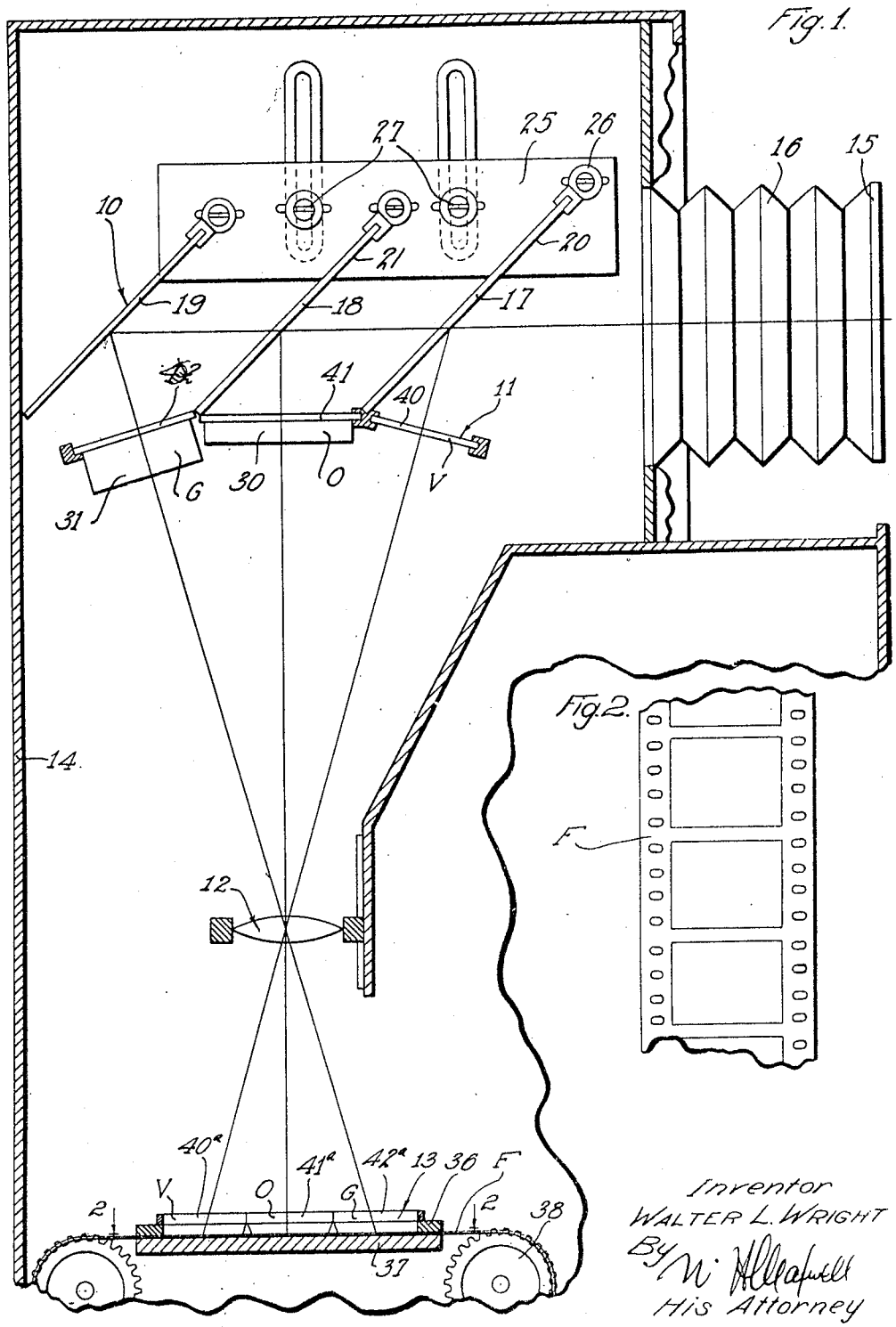

Patented Oct. 17, 1933

1,930,498

UNITED STATES PATENT OFFICE 1,930,498

OPTICAL SYSTEM FOR MOTION PICTURE PHOTOGRAPHY

Walter L. Wright, Santa Monica, Calif., assignor to Synchrome Corporation, Los Angeles County, Calif., a corporation of California Application September 19, 1930
Serial No. 482,929

3 Claims. (Cl. 88—1)

This invention relates to an optical system particularly useful in motion picture photography, and it is an object of the present invention to provide an optical system for a camera whereby a plurality of like images of different chromatic values of a subject can be obtained simultaneously on a film in adjoining relation.

The present invention has to do with certain features of improvement in an optical system of the type set forth and claimed in Patent Number 1,730,712 issued to me October 8, 1929. The present invention is designed to overcome certain disadvantages which characterize optical systems such as are the subject of the said patent.

In the production of color motion pictures, it is desirable to obtain a plurality of pictures, say, three pictures, each of a different chromatic value of a subject, simultaneously from a single angle and in adjoining relation on a film. In practice it is necessary to use fast lenses in order to obtain proper exposure, and these lenses are necessarily of large diameter. Further, in practice, it has been found impractical to employ optical systems which involve light dividing means, or the like, between the lens and film. This is because a lens practical for motion picture work does not allow sufficient distance between the lens and film to accommodate practical light dividing means.

It is an object of this invention to provide an optical system for taking simultaneously a plurality of like pictures of a subject in adjoining relation on a film, so that the several pictures are clear and distinct and do not in any way overlap or interfere with each other.

A further object of the invention is to provide an optical system of the character mentioned, employing a single lens device through which the several shafts of light are projected to fall upon the film.

It is another object of the invention to provide an optical system of the character mentioned, in which the light is directed in a manner to make the system applicable to that type of camera in which the film operates vertically.

Another object of this invention is to provide an arrangement and combination of light filtering means which operates to effectively prevent interference between the several shafts of light projected through the lens and onto the film. By the present invention, overlapping light rays that might otherwise interfere with clear definition between the pictures are effectively filtered out.

The various objects and features of my invention will be best and more fully understood from the following detailed description of typical forms and applications of the invention, throughout which description reference is had to the accompanying drawings, in which:

Fig. 1 is a more or less diagrammatic view illustrating the optical system provided by this invention related to a film to obtain pictures so that the pictures of each series are arranged longitudinally of the film. Fig. 2 is a view illustrating a length of film showing the manner in which the pictures are obtained on the film in the apparatus illustrated in Fig. 1. Fig. 3 is a diagrammatic view illustrating a form of the invention in which the light is handled to be projected onto a vertically operating film so that the series of pictures extend across the film.

The optical system provided by this invention includes, generally, light dividing means 10 operable to divide a shaft of light from a subject into a plurality of like spaced shafts of light, means 11 for chromatically influencing the several shafts of light obtained from the means 10 so that they are chromatically different or of different chromatic values of the subject, a single lens device 12 arranged to pass the shafts of light from the means 10 and direct them onto a film F to expose the picture areas of the film, and means 13 between the lens device 12 and the film F filtering the light falling on the film so that only light of the desired different chromatic values falls on the different picture areas of the film.

In Fig. 1, I illustrate the various parts provided by the invention arranged within a suitable housing or casing 14 provided with an aperture or mat plate 15 for admitting light into the optical system. A suitable bellows 16 may be provided in connection with the mat plate, as shown in the drawings, to form a shield to eliminate, as far as possible, stray or diffused light that would otherwise enter the casing.

The light dividing means 10 includes, generally, a first light divider 17 diagonally or angularly disposed in the path of the shaft of light passing through the mat plate 15, a second light divider 18 arranged in spaced relation behind the first light divider and in the path of the shaft of light passed through the mat plate 15 and divider 17, and a reflector 19 arranged in spaced relation behind the second light divider.

The first light divider 17 may be in the form of a transparent plate having a front reflective surface 20 operable to reflect off part of the light falling on it. The plate forming the light divider 17, being transparent, passes the light not reflected off by the front face 20. The light passing through the light divider 17 continues in the direction of the original shaft entering the system through the mat plate 15 and falls upon the second light divider 18. The second light divider may be of the same general nature as the first light divider, that is, it may be a transparent plate having a front reflective surface 21 operable to reflect off part of the light falling on it. The light that passes through the second light divider 18 continues in the direction of the original shaft of light until it falls upon the reflector 19. The reflector 19 is preferably a front surface reflector.

The light dividers and reflector are arranged so that the surfaces 20 and 21 and the surface of the reflector 19 are at different angles in the path of light entering the system through the mat plate, so that the shafts of light reflected off converge to intersect at a point between the light dividers and reflector and the film. In practice, the surfaces 20 and 21 and the reflector 19 are spaced far enough apart, one behind the other, so that the shafts of light reflected off by them do not interfere, it being desirable, however, to keep the light dividers and reflectors as close together as possible.

In the arrangement illustrated in the drawings, the reflective surface 21 of the second light divider is arranged at an angle of 45° to the original shaft of light entering the system, so that the shaft reflected off by it is at an angle of 90° to the original shaft of light. The reflective surface 20 of the first light divider is arranged in the path of the shaft of light falling on it at an angle somewhat less than 45°, so that the shaft reflected off forms an angle somewhat greater than the 90° with the original shaft of light entering the system. The reflector 19 is disposed in the back of the path of the shaft of light falling on it at an angle somewhat less than 45°, so that the shaft reflected off by it is at an angle somewhat less than 90° with the shaft of light entering the system.

The parts of the light dividing means may be mounted in any suitable manner. In the case illustrated, the dividers 17 and 18 and the reflector 19 are shown on a carrier 25, which, in turn, is mounted in the casing 14. The dividers and reflectors are mounted through screw members 26, so that they can be placed at different angular positions and can be shifted bodily in a direction longitudinal of the shaft of light entering the system. Carrier 25 is shown mounted through screws 27, so that it can be adjusted in a direction at right angles to the shaft of light entering the system.

In practice I may provide compensating means for the light dividing apparatus, in or connected with it, to compensate for the slight differences in size between the several shafts of light caused by the divisions in distance the several shafts travel in reaching a point at which they intersect. For this purpose, I may provide bodies or blocks 30 and 31 of transparent material in the paths of the shafts of light reflected off by the surface 21, and the reflector 19, respectively, the material of the blocks being such as to refract the light in a manner to effect the desired compensation.

The lens device 12, which is illustrated diagrammatically in the drawings is interposed between the light dividing means and film F in a simple embodiment of the invention, such as is shown in Fig. 1. The light from the dividing means 10 passes directly through the lens device and then on to the film. The lens device may be of a standard type practical for the production of motion pictures, for instance, it may be be a flat or wide aperture lens having a focal length suitable for motion picture work.

The shafts of light, after passing through the lens device 12, fall on the film F to expose adjacent picture areas of the film. The film may be handled in a suitable mechanism including an aperture plate 36, a backing plate 37, and film handling sprocket 38. In the arrangement illustrated in Figs. 1 and 2, a series of pictures are obtained longitudinally of the film.

In accordance with the present invention, the several shafts of light falling on the film F are made different chromatically. This may be accomplished in various ways, for example, the reflected shafts leaving the light dividers 17, 18, and the reflector 19, may be passed through color filters. In the drawings I have illustrated a filter 40 in the path of the shaft of light reflected off by the surface 20, a filter 41 in the path of the shaft of light reflected off by the surface 21, and a filter 42 in the path of the shaft of light reflected off by the reflector 19. The several filters are different chromatically, for example, the filter 40 may be of violet, and the filter 41 of orange, and the filter 42 green. By thus filtering the light dividing means, the several shafts falling on the film F are of different chromatic values of the subject.

It will be obvious that the light dividers 17 and 18 may be in the nature of color filters to obviate any reflections there may be from the back walls or surfaces of the dividers. The chromatic character of the light dividers 17 and 18 may be related to the color filters 40 and 41 to eliminate the possibility of the dividers reflecting double images. With the particular combination of filters 40 and 41 described above, the light divider 17 may be yellow and the light divider 18 may be green.

In accordance with my present invention, a perfect separation of the several shafts of light is obtained at the film F by arranging color filters in the paths of the several shafts of light immediately in front of the film. The color filter 40ᵃ is arranged immediately in front of the film to pass the shaft of light reflected by the surface 20 through the filter 40. A color filter 41ᵃ is arranged immediately in front of the film F to pass the shaft of light reflected by the surface 21 through the filter 41. A filter 42ᵃ is arranged immediately in front of the film to pass the shaft of light reflected by the reflector 19 through the filter 42. The filters 40ᵃ, 41ᵃ, and 42ᵃ correspond in color of chromatic values with filters 40, 41, and 42 respectively, so that light passed by the filter 40 is freely passed by the filter 40ᵃ, and therefore falls upon the film F, while the light passed by the filter 41 is freely passed by the filter 41ᵃ and falls upon the film F, and light passed by the filter 43 is freely passed by the filter 42ᵃ and falls upon the film F. It will be obvious, however, that the filters 40ᵃ, 41ᵃ, and 42ᵃ prevent stray or undesirable rays from falling upon the film F, and, therefore, are such as to make possible clear and distinct division between adjoining pictures even though the pictures may be closely related on the film, for example, the filter 40ᵃ is, in the case illustrated, made violet and of such depth as to effectively cut out or filter out orange or the values in the picture adjoining the violet picture. The filter 41ᵃ is made orange and of such value as to effectively filter out violet and green, which are the values in the pictures on either side of the orange picture. The filter 42ª is made green and of such value as to filter out orange, which is the color of the picture adjoining the green picture. Through this combination and arrangement of filters, a definite separation of the several pictures is obtained at, or immediately in front of, the film F, and it is, therefore, possible to obtain pictures on the film F immediately adjoining each other and clearly distinct and separate from each other.

In the form of the invention illustrated in Fig. 3, the light is handled so that it falls upon the film from the same general direction that it enters the system and the pictures of each series are exposed on a vertically extending film and so that they extend transversely of the film. In this form of the invention, the shaft of light from the subject falls upon a reflector 50 which directs it off horizontally and at an angle of 90°. The reflector 50 may be a prismatic reflector such as I have illustrated. The horizontally reflected shaft from the reflector 50 enters the light dividing means 10, which divides it into a plurality of spaced shafts, which are projected downwardly and which are slightly convergent. The light dividing means 10 in this form of the invention may be the same as that hereinabove described. A reflector 51 receives the downwardly extended or reflected shafts from the light dividing means and reflects them horizontally and in the direction of the original shaft of light from the subject. The spaced shafts thus projected horizontally by the reflector 50 are passed through the lens device 12 to fall upon the film F. The film F may, in this case, operate vertically, in which case the series of pictures obtained is transverse of the film instead of being longitudinal as shown in Fig. 2. By thus directing the light, the system is made applicable to standard camera construction, it being standard practice in most picture cameras to move the film F vertically, and, therefore, the light falls upon the film from the direction of the object being photographed.

It will be obvious how the means 13 provided by this invention may be incorporated in the optical system just described; for instance, filters 40, 41, and 42, of different chromatic value, may be arranged in the paths of the shafts reflected off by the light dividing means and filters 40ª, 41ª, and 42ª may be arranged in the paths of the shafts of lights and located immediately in front of the film to effect distinct separation of the pictures on the film as hereinabove described.

Having described only typical preferred forms of my invention, I do not wish to limit myself to the specific details set forth, but wish to reserve to myself any changes or variations that may appear to those skilled in the art or fall within the scope of the following claims.

Having described my invention, I claim:

1. An optical system for making simultaneously a plurality of like chromatically different pictures of a single subject on separate areas of a film, including a single lens, light dividing means between the lens and subject receiving a shaft of light from the subject and dividing it into a plurality of like shafts, and filtering means in the shafts of light from the dividing means making the shafts chromatically different, the filtering means including filters of different colors in the shafts of light between the lens and light dividing means and filters in the shafts of light close to the film, the two filters in each shaft of light corresponding in color.

2. An optical system for making simultaneously a plurality of like chromatically different pictures of a single subject on separate areas of a film, including a single lens, a light dividing means between the lens and subject, including a plurality of reflectors, one behind the other, in the path of a shaft of light from the subject and at different angles in said shaft to reflect off converging shafts through the lens and onto the film, and filtering means in the shafts of light from the dividing means making the shafts chromatically different the filtering means including filters in the paths of the shafts of light between the dividing means and lens and filters in the paths of the shafts of light adjacent the film.

3. An optical system for making simultaneously a plurality of like chromatically different pictures of a single subject on separate areas of a film including a reflector receiving a shaft of light from the subject and directing it horizontally at right angles to its original direction, light dividing means receiving the reflected light and directing slightly convergent shafts of light downwardly from different points along the axis of the reflected light, a reflector receiving the shaft of light from the dividing means and directing them horizontally toward the film, a single lens in the path of the shafts of light between the last mentioned reflector and film, and filtering means in the shaft of light reaching the film making them chromatically different.

WALTER L. WRIGHT.